(12) United States Patent  (10) Patent No.: US 8,812,641 B2
Robin  (45) Date of Patent: Aug. 19, 2014

(54) PROCESSING LOAD WITH NORMAL OR FAST OPERATION MODE

(75) Inventor: Jean-Luc Robin, Saint Jean (FR)

(73) Assignee: Freescale Semiconductor, Inc., Austin, TX (US)

( * ) Notice: Subject to any disclaimer, the term of this patent is extended or adjusted under 35 U.S.C. 154(b) by 394 days.

(21) Appl. No.: 13/120,477

(22) PCT Filed: Sep. 30, 2008

(86) PCT No.: PCT/IB2008/055632
§ 371 (c)(1),
(2), (4) Date: Mar. 23, 2011

(87) PCT Pub. No.: WO2010/038108
PCT Pub. Date: Apr. 8, 2010

(65) Prior Publication Data
US 2011/0173312 A1  Jul. 14, 2011

(51) Int. Cl.
*G06F 15/16*  (2006.01)

(52) U.S. Cl.
USPC ............ 709/223; 709/224; 370/229; 455/130

(58) Field of Classification Search
USPC ........................... 709/223, 224; 370/254–260
See application file for complete search history.

(56) References Cited

U.S. PATENT DOCUMENTS

| | | | | |
|---|---|---|---|---|
| 6,049,882 | A * | 4/2000 | Paver | 713/322 |
| 6,356,538 | B1 | 3/2002 | Li | |
| 6,594,701 | B1 * | 7/2003 | Forin | 709/232 |
| 6,961,309 | B2 | 11/2005 | Carlson et al. | |
| 7,225,266 | B2 | 5/2007 | Ameigeiras et al. | |
| 8,046,762 | B2 * | 10/2011 | Sugiyama | 718/102 |
| 8,086,886 | B2 * | 12/2011 | Schmidt et al. | 713/323 |
| 8,108,529 | B1 * | 1/2012 | Wright | 709/227 |
| 8,667,181 | B2 * | 3/2014 | Ando | 709/248 |
| 2003/0137945 | A1 * | 7/2003 | Yavatkar et al. | 370/282 |
| 2005/0273636 | A1 * | 12/2005 | Grobman | 713/322 |
| 2006/0034286 | A1 * | 2/2006 | Koning et al. | 370/394 |

(Continued)

FOREIGN PATENT DOCUMENTS

JP  2000311026 A  * 11/2000  ................ G06F 1/04

OTHER PUBLICATIONS

Jaehyuk Jang et al: "Adaptive Power Saving Strategies for IEEE 802.16e Mobile Broadband Wireless Access" Communications, 2006 Asia-Pacific Conference ON, IEEE, PI, Aug. 1, 2006, pp. 1-5.

(Continued)

*Primary Examiner* — Hassan Kizou
*Assistant Examiner* — Deepa Belur

(57) ABSTRACT

A data processing apparatus includes a processing unit for processing data, including receiving data packets from a sender and sending acknowledgements to the sender, the processing unit having a first and second mode of operation, the second mode of operation requires more power than the first mode, and the processing unit switches between the first and second modes of operation based on a processing load; a metric module for determining a metric indicative of the processing load; an acknowledgement module for sending one acknowledgement in respect of n received data packets; and an acknowledgement configuration module for setting n to be a value m greater than a first predetermined value if the metric lies in a predetermined range that includes a value that the metric assumes when the processing unit switches between the first mode of operation and the second mode of operation, and to the first predetermined value otherwise.

9 Claims, 9 Drawing Sheets

(56) References Cited

U.S. PATENT DOCUMENTS

| | | | |
|---|---|---|---|
| 2006/0035589 A1* | 2/2006 | Shvodian | 455/18 |
| 2007/0124440 A1* | 5/2007 | Maki | 709/223 |
| 2007/0230479 A1 | 10/2007 | Liu | |
| 2008/0224903 A1 | 9/2008 | Samuels et al. | |
| 2009/0028091 A1* | 1/2009 | Dimou | 370/328 |
| 2013/0136139 A1* | 5/2013 | Zheng et al. | 370/401 |

OTHER PUBLICATIONS

Jose P et al: "Performance of Link Adaptation in GPRS Networks" Vehicular Technology Conference, 2000, IEEE VTS Fall VTC 2000, 52nd Sep. 24-28, 2000, Piscataway, NJ, USA, IEEE, vol. 2, Sep. 24, 2000, pp. 492-499.

Altman Eitan et al: "Novel Delayed ACK Techniques for Improving TCP Performance in Multihop Wireless Networks" PWC 2003, LNCS 2775, pp. 237-250, 2003.

Aweya James et al: "A Self-Regulating TCP Acknowledgement (ACK) Pacing Scheme" International Journal of Network Management, vol. 12, Issue 3, pp. 145-163, Published Online: Jan. 8, 2002 (http://osnet.cs.nchu.edu.tw/powpoint/seminar/2008/Self_ack.pdf).

International Search Report and Written Opinion correlating to PCT/IB2008/055632 dated Jun. 30, 2009.

* cited by examiner

PROCESSING LOAD WITH NORMAL OR FAST OPERATION MODE

FIELD OF THE INVENTION

This invention relates to a data processing apparatus and a method for processing data.

BACKGROUND OF THE INVENTION

Many data processing apparatus have a processing unit for processing data. Some processing units have a single processor for processing data. Other processing units have multiple processors for processing data, in which case these processors may work independently of each other or may work in cooperation with each other.

Some processors have two or more "modes of operation", with the processor being able to switch between these various modes depending on the current processing circumstances or conditions. Each of these modes relates to a respective frequency at which the processor runs (i.e. a frequency at which the processor is clocked) when operating/processing in that mode. The higher the frequency, the more processing operations or cycles that the processor can perform per unit time. The ability to change the processing frequency allows the processor to process data at different data rates (i.e. perform more or less data processing operations per unit time), depending on the frequency at which processor is caused to run due to its current mode of operation.

For example, it is common for many processors to have a "normal mode" and a "turbo mode", where the processor runs at a higher processing frequency when in turbo mode than when in normal mode. The processor will normally be run in its normal mode. However, the processor (operating in normal mode) may detect that it cannot satisfy the data processing rate being demanded of it, i.e. the required processing would use more processing cycles per unit time than are available from the processor in normal mode. This can occur, for example, when there has been an increase in data throughput or an increase in the amount of data being received by the processor for processing, so that more data needs to be processed per unit time. When the processor detects this, then the processor may switch to the turbo mode. In the turbo mode, the processor runs at a higher processing frequency and is therefore better able to satisfy the current data processing rate being demanded of the processor. The processor may then revert to the normal mode when the data processing rate has reduced sufficiently such that the processor can satisfy that reduced data processing rate in the normal mode.

However, the various modes of operation generally use different amounts of power. In particular, the processor may have a first mode of operation and a second mode of operation, with the processor running at a higher frequency when in the second mode of operation than when in the first mode of operation. In this case, the processor will generally use (require, consume or draw) more power when in second mode of operation than when in the first mode of operation.

These differences between the power consumption of the various modes of operation can have a large impact on the lifetime of a battery, or the period required before a rechargeable battery needs recharging, for battery-powered devices such as mobile telephones, laptops, personal digital assistants, etc. It would therefore be desirable for the processor to be able to control its use of its modes of operation in a way that reduces the overall power consumption, by avoiding, where possible, the modes of operation that consume the higher levels of power. This would help improve the lifetime of a battery. This would also have an overall reduction on the power consumption of any apparatus that use such processors (whether battery-powered or not), causing them to be cheaper to operate and be more environmentally friendly.

SUMMARY OF THE INVENTION

The present invention provides a data processing apparatus, a method of processing data and a computer program as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader scope of the invention as set forth in the appended claims.

Figure 1:
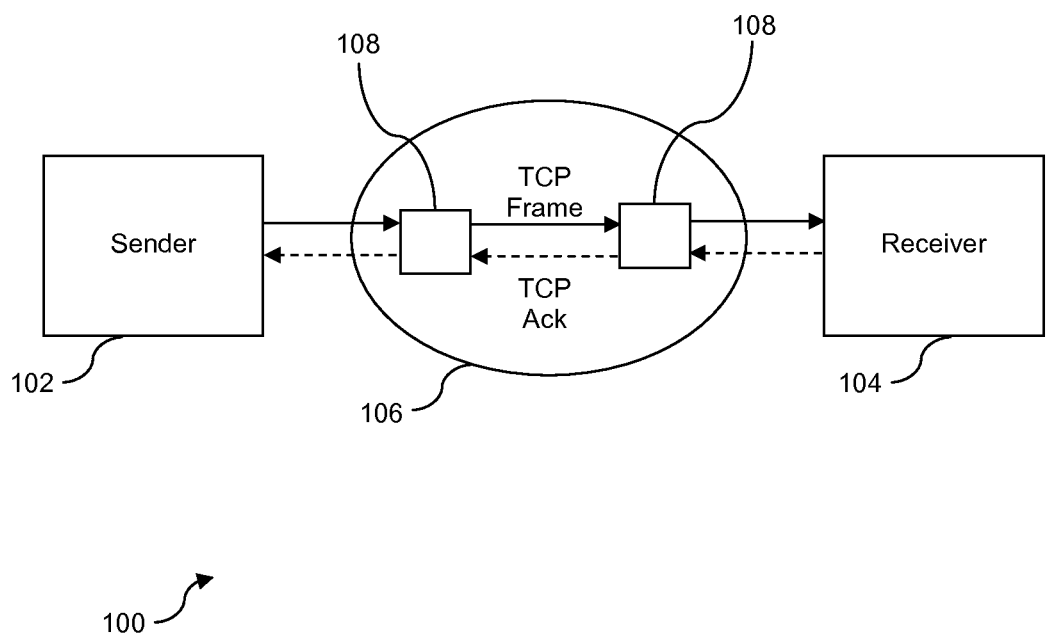
FIG. 1 schematically illustrates an overview of a communications system that makes use of embodiments of the invention.

FIG. 1 schematically illustrates an overview of a communications system 100 that makes use of embodiments of the invention. In the communications system 100, a sender 102 communicates data to a receiver 104 via a network 106.

The network 106 may comprise one or more network components 108, which may include, for example, subnetworks in their own right, gateways, routers, etc. as is well known in this field of technology. The network 106 may be any kind of network suitable for communicating data between the sender 102 and the receiver 104, such as one or more of: the Internet; a local area network; a wide area network; a metropolitan area network; a radio network; etc. The network 106 may be a wireless network or may involve cables, or may be a mixture of the two.

The sender 102 and receiver 104 may each be any device or apparatus suitable for sending and receiving data via the network 106. For example, the sender 102 and receiver 104 may each be: a personal computer system, a mainframe, a minicomputer, a server, a workstation, a personal computer, a notepad, a personal digital assistant, an electronic games console, an automotive or other embedded system, a cell phone or mobile telephone, or various other wireless devices. The sender 102 and receiver 104 may be portable devices, or may be fixed-location devices.

In the example shown in FIG. 1, the sender 102 and receiver 104 are shown as communicating via the TCP protocol. The TCP protocol is well-known and therefore it will not be described in full detail herein. With the TCP protocol, the sender 102 sends a series of TCP frames (or data packets) to the receiver 104. The receiver 104 is then arranged to send acknowledgements back to the sender 102 to acknowledge receipt of the data packets that the receiver 104 has received. In FIG. 1, the data packets sent by the sender 102 are shown using solid-line arrows, whilst the acknowledgements sent by the receiver 104 are shown using dashed-line arrows.

The receiver 104 is configured to send one acknowledgement back to the sender 102 to indicate that it has received n data packets. As is known, the value of n may be greater than 1, in which case the receiver 104 is employing so-called "delayed-Ack". The value of n may be equal to 1, in which case the receiver 104 is not employing delayed-Ack. The use of delayed-Ack for the TCP protocol is set out in IETF RFC 1122—see, (i) http://www.rfc-archive.org/getrfc.php?rfc=1122 or (ii) http://www.faqs.org/rfcs/rfc1122.html (in particular section 4.2.3.2) the entire disclosures of which are incorporated herein by reference.

It will be appreciated that other communications protocols may be used. Embodiments of the invention simply make use of communication between the sender 102 and receiver 104 in which (i) the sender 102 transmits data packets to the receiver 104; and (ii) the receiver 104 transmits acknowledgements back to the sender 102 to acknowledge receipt of the data packets that the receiver 104 has received, where one acknowledgement is transmitted back to the sender 102 to indicate that the receiver 104 received n data packets. The n data packets to which a single acknowledgement corresponds may be n consecutive data packets in an ordered series of data packets. The acknowledgement frequency is defined to be $$f = \frac{1}{n}.$$

As will be described in more detail below, embodiments of the invention concern when and how to select the value of n to use.

Figure 2:
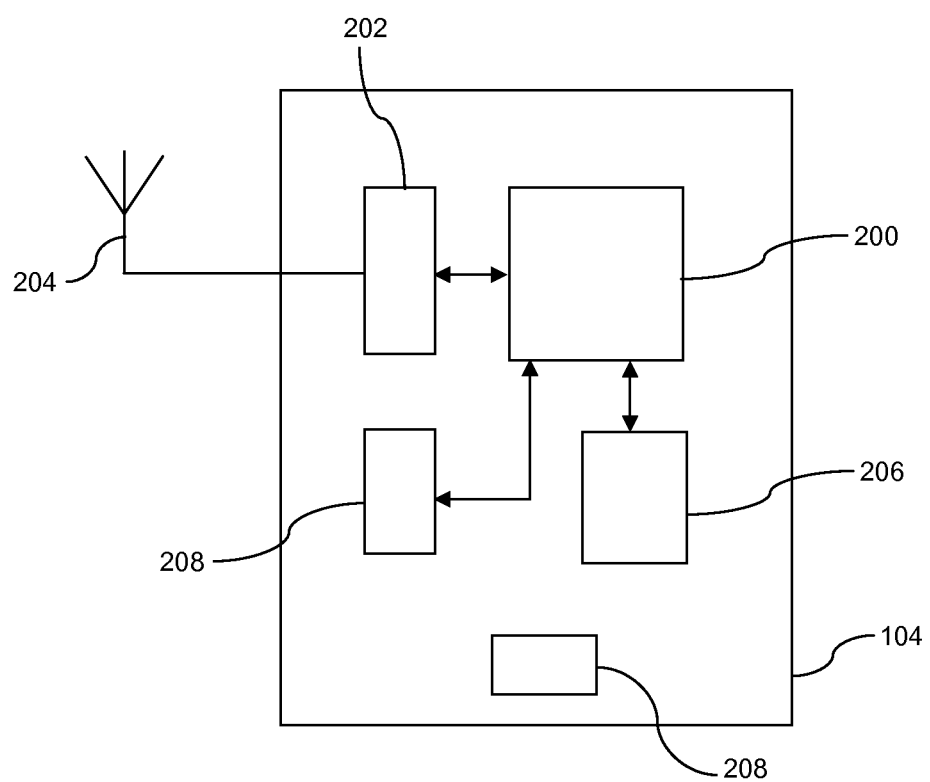
FIG. 2 schematically illustrates the main components of a receiver according to an embodiment of the invention.

FIG. 2 schematically illustrates the main components of a receiver 104 according to an embodiment of the invention. In the embodiment shown in FIG. 2, the receiver 104 is a wireless communications device (such as a mobile or portable telephone, a cell phone, a laptop, a personal digital assistant, or any other communication device operable to communicate over a wireless communications link). It will be appreciated that the receiver 104 may comprise more functional components than are actually illustrated in FIG. 2.

The receiver 104 comprises a processing unit (or processor) 200 for carrying out operational processing for the receiver 104 (which includes the receiving of data packets and the sending of acknowledgements, as discussed above). The receiver 104 also has a communication section 202 for providing and enabling wireless communication via a wireless communication link. The communication section 202 typically comprises an antenna 204, a modulation/demodulation section (not shown), and a coding/decoding section (not shown), for example, as will be known to a skilled person and thus will not be described further herein. The communication section 202 is coupled to the processing unit 200.

The receiver 104 also has a man-machine-interface (an MMI) 206, including elements such as a key pad, microphone, speaker and display screen, for providing an interface between the receiver 104 and a user of the receiver 104. The MMI 206 is also coupled to the processing unit 200.

The processing unit 200 may be a single processor or may comprise two or more processors carrying out all of the processing required for the operation of the receiver 104. The number of processors and the allocation of processing functions to the processors is a matter of design choice for a skilled person.

The receiver 104 also has a memory 208 storing programs for execution by the processing unit 200. The stored programs contain processor instructions for execution by the processing unit 200 to control operation of the receiver 104. The programs may contain a number of different program elements or sub-routines containing processor instructions for a variety of different tasks, for example, for: communicating with the user via the MMI 206; controlling the receipt of data packets from the sender 102 and the sending of acknowledgements back to the sender 102; and for carrying out embodiments of the invention to set the acknowledgement frequency f by setting the value for n.

The receiver 104 may be powered by one or more batteries 210.

It will be appreciated that embodiments of the invention are not limited to the specific configuration for the receiver 104 illustrated in FIG. 2. The receiver 104 simply requires a processing unit 200, having one or more processors, that is arranged to receive data packets and to send acknowledgements in respect of those data packets (the acknowledgements being sent in the above-described manner).

In one embodiment of the invention, the processing unit 200 has two modes of operation (or operational/running/processing states) available for processing data (which includes receiving data packets and sending acknowledgements). During the data processing, the processing unit 200 will use one of these two different modes of operation. The first mode of operation shall be referred to as the "normal mode" and the second mode of operation shall be referred to as the "turbo mode". The processing unit 200 clocks its one or more processors at a higher frequency in the turbo mode than the frequency it runs the one or more processors when operating in the normal mode. In other words, the processing unit 200 is able to perform more operations per unit time when in the turbo mode than when in the normal mode. For example, in one embodiment, the processing unit 200 has two processors which run at 208 MHz and 400 MHz respectively in the normal mode, but which run at 312 MHz and 512 MHz respectively in the tubro mode. Consequently, the processing unit 200 requires (draws, uses or consumes) more power when it is operating in the turbo mode than when it is operating in the normal mode.

The processing unit 200 is arranged to switch or move between the normal mode and the turbo mode, depending on the current processing circumstances. The processing unit 200 may, for example, execute a task (which may be a high-priority task) that monitors the current processing situation and parameters for the current processing and that determines, based on this monitoring, whether the processing unit 300 should be running in the normal mode or in the turbo mode.

Figure 3:
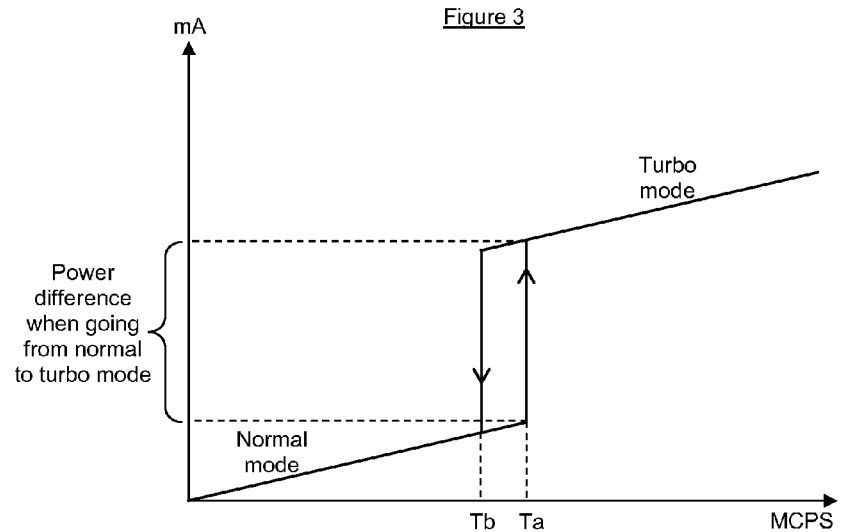
FIG. 3 schematically illustrates the switching between a normal mode and a turbo mode, and the resulting impact on the power consumed, by a processing unit according to an embodiment of the invention.

FIG. 3 schematically illustrates the switching between the normal mode and the turbo mode, and the resulting impact on the power consumed by the processing unit 200 according to an embodiment of the invention. The processing unit 200 is arranged to measure or monitor the current processing load for the processing unit 200. In the example shown in FIG. 3, this load is measured in terms of how many processing cycles are required per unit time in order to perform the data processing currently being demanded of the processing unit 200. This may be measured in millions of cycles per second (MCPS). In FIG. 3, the switching between normal mode and turbo mode is based on the measured MCPS-requirement for the data processing.

If the processing unit 200 is currently operating in the normal mode, then it will remain in the normal mode provided that the measured MCPS-requirement remains below a first threshold Ta. If the measured MCPS-requirement rises to the first threshold Ta, then the processing unit 200 begins operating in the turbo mode. As can be seen from FIG. 3, this results in an increase in current drawn by the processing unit 200, and hence an increase in the power being consumed by the processing unit 200.

If the processing unit 200 is currently operating in the turbo mode, then it will remain in the turbo mode provided that the measured MCPS-requirement remains above a second threshold Tb. If the measured MCPS-requirement falls to the second threshold Tb, then the processing unit 200 begins operating in the normal mode. As can be seen from FIG. 3, this results in a decrease in current drawn by the processing unit 200, and hence a decrease in the power being consumed by the processing unit 200.

The first threshold Ta may be the same as the second threshold Tb. However, the first threshold Ta is normally greater than the second threshold Tb to avoid the processing unit 200 from jittering between the normal mode and the turbo mode, which would result in undesirably large processing delays whilst the processing unit 200 switches between the normal mode and the turbo mode.

Embodiments of the invention aim to help prevent the processing unit 200 from having to switch from using the normal mode of operation to using the turbo mode of operation. Additionally, embodiments of the invention aim to enable the processing unit 200 to switch from using the turbo mode of operation to using the normal mode of operation. In this way, the amount of power consumed by the processing unit 200 can be reduced. For receivers 104 that use a battery 210 as the power source, embodiments of the invention can help prolong the lifetime of the battery and/or increase the period before a rechargeable battery has to be recharged. Additionally, this reduction in power consumption (whether for battery-powered receivers 104 or non-battery-powered receivers 104), causes the receiver 104 to be cheaper to operate and more environmentally friendly.

Embodiments of the invention achieve this due to the recognition that decreasing the acknowledgement frequency f (i.e. increasing the value of n) for sending acknowledgements back to the sender 104 results in the processing unit 200 having to perform fewer computations per unit time. This is due to there being fewer acknowledgements to send per unit time as n is increased. This results in a saving in the MCPS-requirement.

Figure 4:
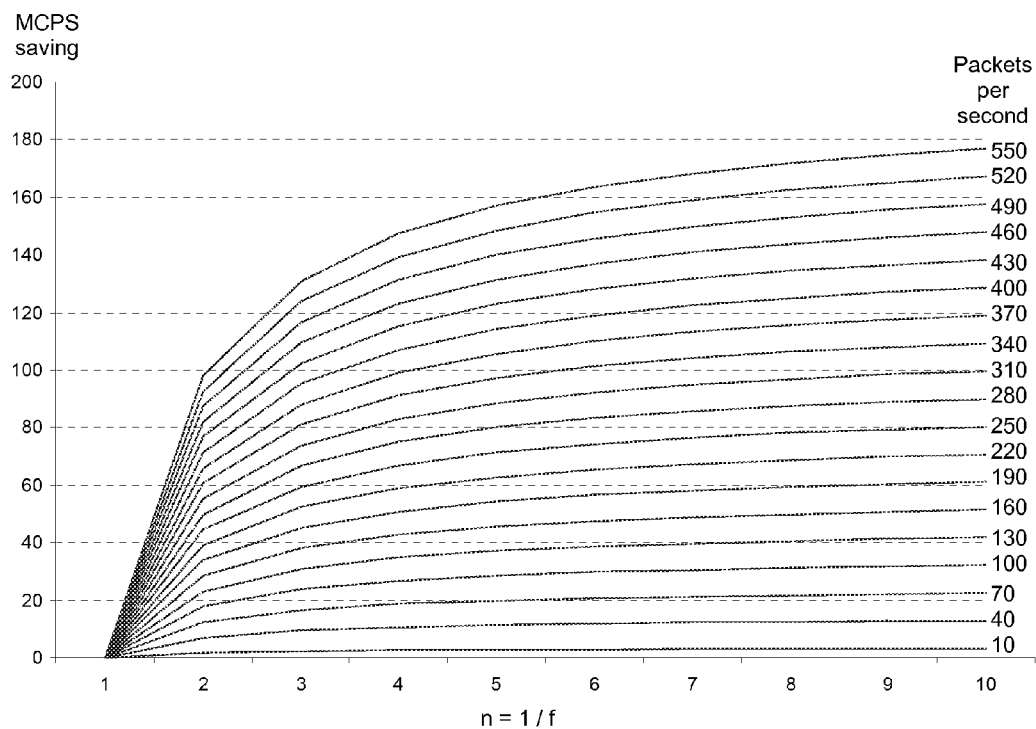
FIG. 4 is a graph illustrating example savings in MCPS-requirements for the processing in one embodiment of the invention.

FIG. 4 is a graph illustrating example savings in MCPS-requirements for the processing in one embodiment when different values of n are used. The saving in MCPS is the saving in comparison to when the value of n is equal to 1 (i.e. in comparison to when delayed-Ack is not used).

In FIG. 4, multiple plots are shown, each plot corresponding to a respective rate at which data packets are received by the receiver 104 (which shall be referred to as the packet rate). As can be seen, for a given value of n, greater savings in MCPS are achieved for higher packet rates. This is because, at higher packet rates, more packets are received by the receiver 104 and hence the receiver 104 needs to send more acknowledgements.

Figure 5:
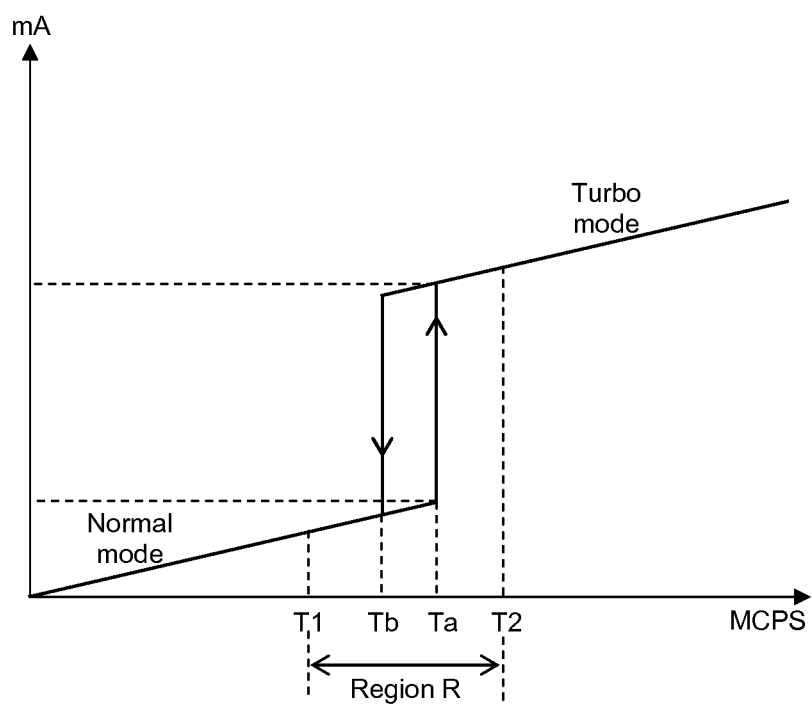
FIG. 5 schematically illustrates an overview of how a processing unit determines an acknowledgement frequency according to an embodiment of the invention.

FIG. 5 schematically illustrates an overview of how the processing unit 200 determines the value of n to use, i.e. determines the acknowledgement frequency to use. FIG. 5 is similar to FIG. 3, except that two additional MCPS-requirement thresholds are used: (1) a third threshold T1, lower than Ta and Tb and (2) a fourth threshold T4, higher than Ta and Tb. The thresholds T1 and T2 define a region (or range of values) R from T1 to T2. The range R therefore includes a value for the MCPS-requirement at which the processing unit 200 switches between the normal mode and the turbo mode, namely: (1) the value Ta when considering switching from normal mode to turbo mode; and (2) the value Tb when considering switching from turbo mode to normal mode.

If the current MCPS-requirement, as measured (or monitored or assessed) by the processing unit 200, does not lie in the region R, then the processing unit 200 sets the value of n to be a predetermined value p. In one embodiment, this predetermined value p may be equal to 1, i.e. when the current MCPS-requirement is not in the range R, then the processing unit 200 does not use delayed-Ack. However, in other embodiments, the predetermined value p may be an integer greater than 1, such as 2 or 3.

If the current MCPS-requirement, as measured (or monitored or assessed) by the processing unit 200, lies in the region R, then the processing unit 200 sets the value of n to be a value m. The value of m is greater than the above-mentioned predetermined value p which is used when the current MCPS-requirement does not lie in the region R.

In this way, the processing unit 200 decides to use an increased value for n when the MCPS-requirement is close to the MCPS value at which the processing unit 200 would switch either from normal mode to turbo mode, or from turbo mode to normal mode (i.e. when the MCPS-requirement is in the range R). By using an increased value for n in these circumstances, the processing unit 200 decides to forego sending as many acknowledgements as it normally would as a tradeoff for producing an MCPS-saving (i.e. a reduction in the MCPS-requirement), as illustrated in FIG. 4. This saving has the following consequences:

(a) When the processing unit 200 is currently in normal mode, then the above-mentioned MCPS saving means that the processing unit 200 is less likely to reach the stage at which the current MCPS-requirement reaches the threshold Ta. This therefore reduces the likelihood of the processing unit 200 having to switch to the turbo mode, and therefore helps reduce the overall amount of power consumed by the processing unit 200.

(b) When the processing unit 200 is currently in turbo mode, then the above-mentioned MCPS saving means that the processing unit 200 is more likely to reach the stage at which the current MCPS-requirement reaches the threshold Tb. This therefore increases the likelihood of the processing unit 200 being able to switch back to the normal mode, and therefore helps reduce the overall amount of power consumed by the processing unit 200.

The value of T1 may be a predetermined amount lower than Ta or may be a predetermined multiple of Ta (such as 0.8 Ta). Similarly, the value of T2 may be a predetermined amount above Tb or may be a predetermined multiple of Tb (such as 1.25 Tb). The processing unit 200 may be configured to use specific values of T1 and T2, based on Ta and/or Tb, in order to provide a certain desired likelihood of switching to using the higher value of n in order to avoid using turbo mode. In particular, the larger the range R, the more likely it is that the processing unit 200 will avoid using the turbo mode.

The particular choice of the value m will be described in more detail later.

Figure 6:
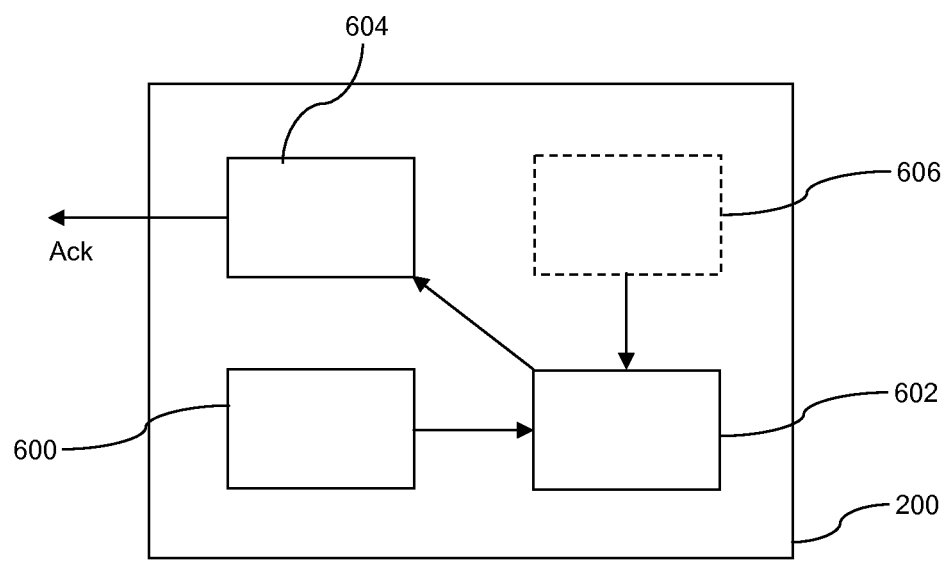
FIG. 6 schematically illustrates functional components of a processing unit according to an embodiment of the invention.

FIG. 6 schematically illustrates functional components of the processing unit 200, according to an embodiment of the invention, that are used to achieve the above-described switching between using different values of n. These functional components may be hardware components of the processing unit 200 and/or may be software components (e.g. a part of one or more processes or tasks being executed by the processing unit 200).

The processing unit 200 comprises a metric module 600 that is arranged to determine a metric (value or property or parameter) indicative of the current processing load for the processing unit 200. This metric may be the actual MCPS-requirement. However, other metrics that have a relationship with (or that are indicative of) the MCPS-requirement could be used, such as the rate at which data packets are being received by the receiver 104 or the number of processing operations or processing cycles that the processing unit 200 needs to perform per unit time in order to perform the current data processing demanded of the processing unit 200 by the receiver 104.

The processing unit 200 also comprises an acknowledgement configuration module 602, which is in communication with the metric module 600. The acknowledgement configuration module 602 makes use a range of values between two threshold values. In the case in which the metric determined by the metric module 600 is the actual MCPS-requirement, then the range used by the acknowledgement configuration module 602 is the range R from the third threshold T1 to the fourth threshold T2, as illustrated in FIG. 5. However, when the metric is another metric having a relationship with the MCPS-requirement, then the acknowledgment configuration module 602 uses a range corresponding to the range R of FIG. 5. The range used includes a value that the metric would assume when the processing unit 200 switches between the normal mode and the turbo mode.

The acknowledgement configuration module 602 is arranged to determine whether or not the metric determined by the metric module 600 lies in that range of values being used. If the metric does not lie in that range of values, then the acknowledgement configuration module 602 sets the value of n to be a predetermined value p. However, if the metric does lie in that range of values, then the acknowledgement configuration module 602 sets the value of n to be an alternative value m, where m is greater than the above-mentioned predetermined value p. The actual method for choosing m will be described in more detail later.

The processing unit 200 also comprises an acknowledgement module 604 that uses the value of n determined and set by the acknowledgement configuration module 602. The acknowledgement module 604 is arranged to send one acknowledgement to the sender 102 in respect of n corresponding data packets that the receiver 104 has received from the sender 102. As such, the acknowledgement module 604 may vary the frequency at which it communicates acknowledgements back to the sender 102, with this variation being in accordance with the value of n set by the acknowledgement configuration module 602, based on the metric determined by the metric module 600.

The processing unit 200 may also comprise an optional packet rate module 606 which is arranged to determine the throughput of data, or a packet rate indicating a rate at which the receiver 104 receives data packets. As described in more detail later, the acknowledgement configuration module 602 may take into account the packet rate (or throughput), as determined by the packet rate module 606, when determining the value of n to use.

Figure 7:
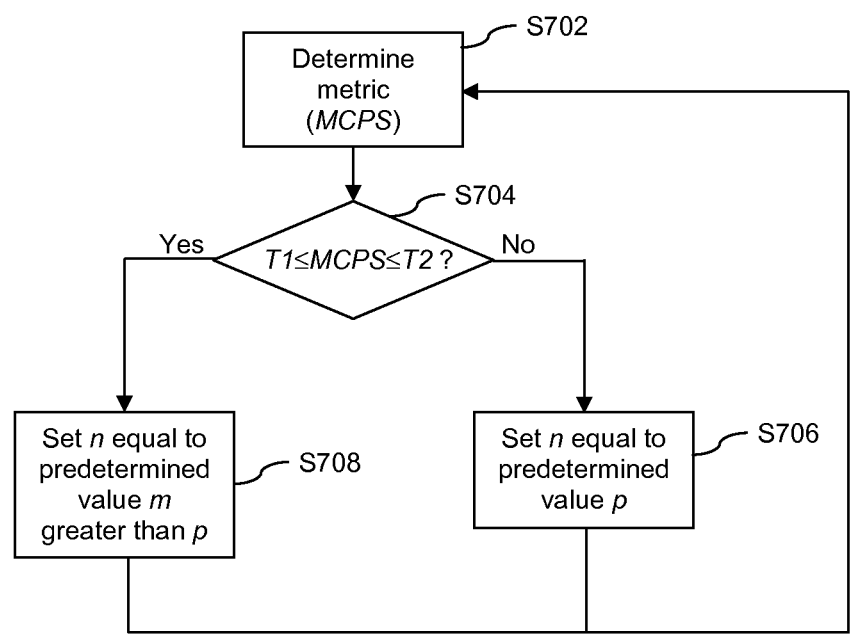
FIG. 7 is a flowchart schematically illustrating the processing performed by the processing unit of FIG. 6 according to an embodiment of the invention.

FIG. 7 is a flowchart schematically illustrating the processing 700 performed by the processing unit 200 of FIG. 6 according to an embodiment of the invention.

At a step S702, the metric module 600 determines the metric that is to be used. In FIG. 7, this metric is the actual MCPS-requirement.

At a step S704, the acknowledgment configuration module 602 determines whether the determined metric lies within the range of values that it is using. As the embodiment of FIG. 7 is using the actual MCPS-requirement as its metric, the range being used is the range R from T1 to T2.

If the metric does not lie in the range of values being used, then, at a step S706, the acknowledgement configuration module 602 sets the value of n to be the predetermined value p. If p equals 1, then this is equivalent to not using delayed-Ack. However, some embodiments use an integer value of p greater than 1.

On the other hand, if the metric lies in the range of values being used, then, at a step S708, the acknowledgement configuration module 602 sets the value of n to be a predetermined value m greater than the predetermined value p. As p is at least 1, then the value of m will be greater than 1, so that delayed-Ack will then be used.

After the steps S706 and S708, processing returns to the step S702. This may be performed in such a way that the processing unit 200 performs the processing 700 at a predetermined frequency (e.g. once every 10 milliseconds).

The processing 700 of FIG. 7 has been shown as a flow diagram that is implemented in order to check the current value of the metric from the metric module 600 and to set the value of n accordingly. However, it will be appreciated that the same result could be achieved in other ways, for example, using a state machine. For example, when the metric values lies outside of the range being used, then the acknowledgement configuration module 602 could be in a first state in which n has been set to the predetermined valued p. In this first state, the acknowledgement configuration module 602 waits for the value of the metric to enter the range being used, in which case the acknowledgement configuration module 602 moves to a second state in which n is set to the predetermined valued m. In this second state, the acknowledgement configuration module 602 waits for the value of the metric to leave the range being used, so that the acknowledgement configuration module 602 can then return to the first state in which the value of n is reset to p.

Figure 8:
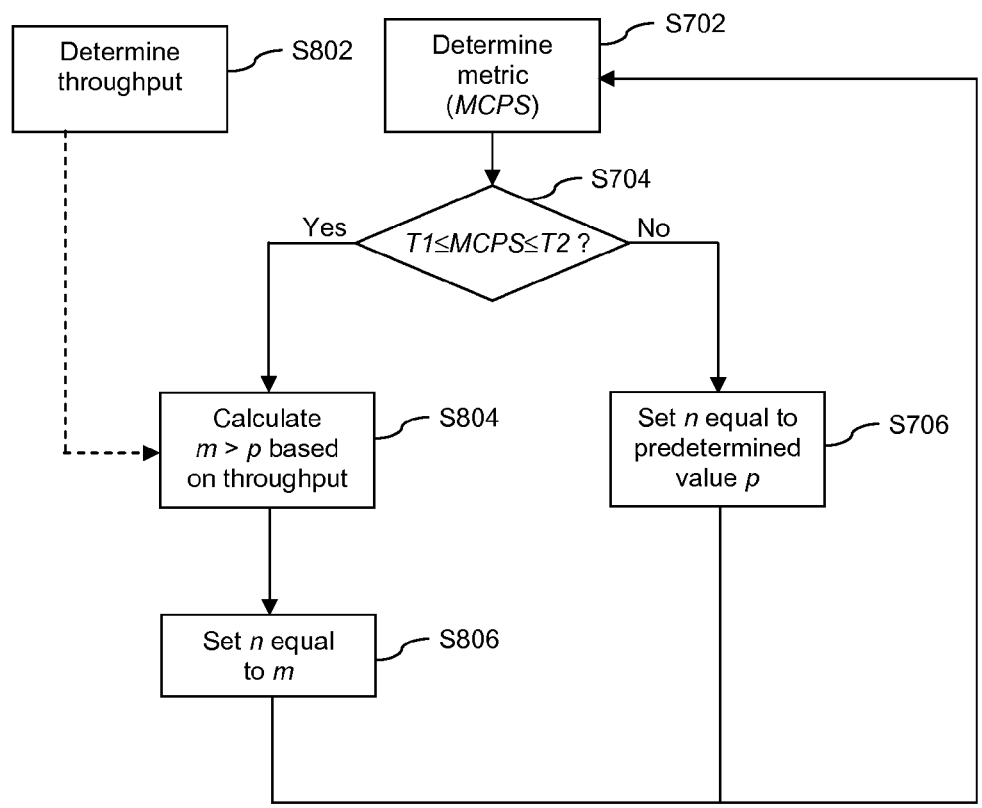
FIG. 8 is a flowchart schematically illustrating the processing performed by the processing unit of FIG. 6 according to another embodiment of the invention.

FIG. 8 is a flowchart schematically illustrating the processing 800 performed by the processing unit 200 of FIG. 6 according to an embodiment of the invention. The processing 800 of FIG. 8 has several steps in common with the processing 700 of FIG. 7. Such steps have the same reference numeral and shall not be described again.

The processing 700 of FIG. 7 set the value of n to be a predetermined value m (greater than the predetermined value p) when the metric lies in the range being used by the acknowledgement configuration module 602. In contrast, the processing 800 of FIG. 8 does not use a predetermined value m, by rather determines a value m to which the value of n is to be set. The value of m is determined by the processing unit 200 based on the current data throughput, i.e. based on the rate at which data packets are being received by the receiver 104.

Hence, at a step S802, the packet rate module 606 monitors, or determines, a packet rate representing the current rate at which the receiver 104 is receiving data packets.

The step S708 of FIG. 7 has been replaced in FIG. 8 by steps S804 and S806. At the step S804, the acknowledgement configuration module 602 uses the packet rate determined by the packet rate module 606 to determine the value m. At the step S806, the acknowledgement configuration module 602 sets the value of n to be the value m determined at the step S804.

The determination of the value of m at the step S804 may rely on the relationship between the packet rate and the MCPS saving as illustrated in FIG. 4. In particular, as shown in FIG. 4, the MCPS saving approaches its asymptote sooner (i.e. at lower values of n) for lower packet rates than for higher packet rates. In other words the increase in MCPS saving becomes negligible sooner (i.e. at lower values of n) for lower packet rates than for higher packet rates. For example, the plots shown in FIG. 4 show that when packet rate is low (say 10 packets per second), there is little benefit in using a value of n above 2 or 3, as increasing n beyond such a value has little impact on the MCPS saving. In contrast, when the packet rate is high (say about 550 packets per second), then there is still benefit in using a value of n above 2 or 3, or even above 9 or 10, as increasing n beyond such a value still has a significant impact on the MCPS saving.

Hence, the acknowledgement configuration module 602 may make use of a predetermined function to determine a value for m based on the current throughput (or packet rate). Alternatively, the acknowledgement configuration module 602 may make use of a lookup table stored in the memory 208. This lookup table could store values to use for m for corresponding packet rates. The acknowledgement configuration module 602 could then chose the entry in the lookup table that has the packet rate closest to the current packet rate, and then use the corresponding value of m indicated in the lookup table. Alternatively, the lookup table could store, for each possible value of m, a corresponding packet rate that represents the lowest and/or the highest value for the packet rate at which that value of m should be selected. In this way, the lookup table splits the possible packet rates into ranges of values, with a corresponding value for m being associated with each range. The acknowledgment configuration module 602 could then chose the value of m corresponding to the range of values within which the current packet rate lies.

Figure 9:
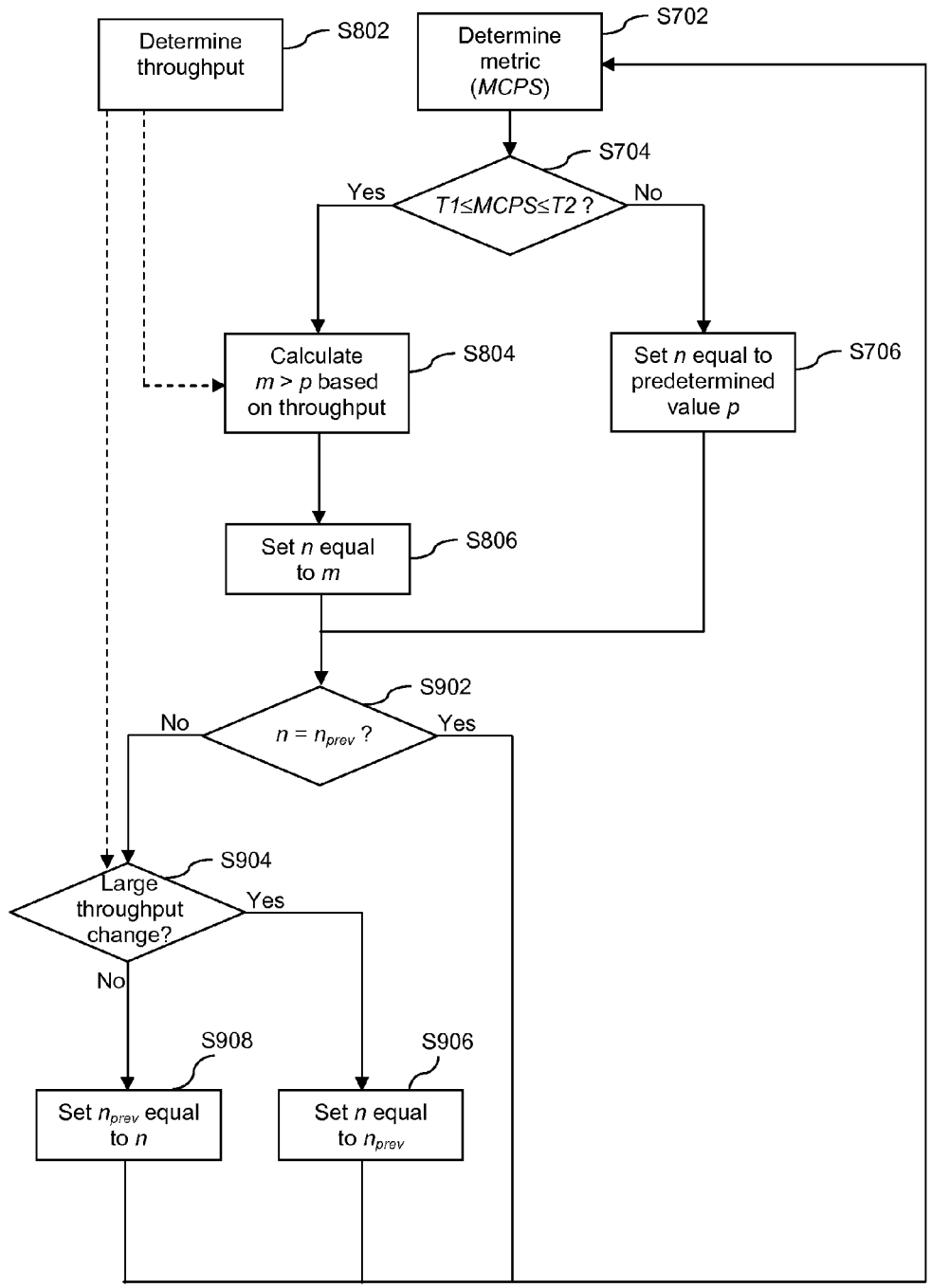
FIG. 9 is a flowchart schematically illustrating the processing performed by the processing unit of FIG. 6 according to another embodiment of the invention.

FIG. 9 is a flowchart schematically illustrating the processing 900 performed by the processing unit 200 of FIG. 6 according to an embodiment of the invention. The processing 900 of FIG. 9 is the same as the processing 800 of FIG. 8, together with a number of further steps. As such, the steps that FIGS. 8 and 9 have in common have the same reference numeral and shall not be described again.

In particular, it may be undesirable for the acknowledgement configuration module 602 to have a large impact on the data throughput. Therefore, in the embodiment of FIG. 9, the processing 900 is arranged to determine whether a change of packet rate that has resulted from changing the value of n to a current value from an immediately preceding value exceeds a predetermined threshold. If this predetermined threshold has been exceed, then the value of n is reset to be the immediately preceding value. Hence, the processing 900 of FIG. 9 makes uses of a variable $n_{prev}$ to store the value that n assumed before it took its current value.

Hence, after the step S706 and after the step S806, at which the acknowledgement configuration module 602 has set the value of n, the acknowledgement configuration module 602, at a step S902, determines whether the current value of n equals $n_{prev}$.

If the current value of n has not changed (i.e. if $n=n_{prev}$), then there are no further checks that need to be made.

However, if the value of n has changed (i.e. if $n \neq n_{prev}$, then processing continues at a step S904 at which the acknowledgement configuration module 602 determines whether changing the value of n from the previous value $n_{prev}$ to its current value has had a large impact on the data throughput (or packet rate). The acknowledgement configuration module 602 uses throughput measurements determined by the packet rate module 606 for the step S904. In particular, if it is determined at the step S904 that the packet rate has changed by over a predetermined percentage of the previous packet rate, or that the packet rate has changed by over predetermined amount from the previous packet rate, then processing continues at the step S906, at which the value of n is reset to be the value of $n_{prev}$; otherwise, then value of $n_{prev}$ is set to be the new value of n at a step S908.

It will be appreciated that the processing 900 may involve a delay before (or as part of) the step S904 in order to give the packet rate module 606 sufficient time to assess the packet rate when using the newly updated value of n. For example, a predetermined wait/delay may be used between the step S902 and the step S904.

In some embodiments, a maximum value for n, $n_{max}$, may be used and imposed at the step S804. This maximum value may be a predetermined maximum value. Alternatively, the maximum value may be calculated at the step S804 as illustrated schematically in FIG. 10.

At a step S1000, the return-trip-time, RTT, (i.e. the time between the sender 102 sending a data packet and the time that the sender 102 receives an acknowledgement in respect of that data packet) is determined. This may be achieved in any known way.

At a step S1002, the current "congestion window" Cwnd is determined, where Cwnd represents the number of data packets that the sender 102 sends out in the time between the sender 102 sending out a particular data packet and the sender 102 receiving the acknowledgement corresponding to that data packet. The step S1002 calculates Cwnd as the product of RTT and the current packet rate (as measured by the packet rate module 606).

Figure 10:
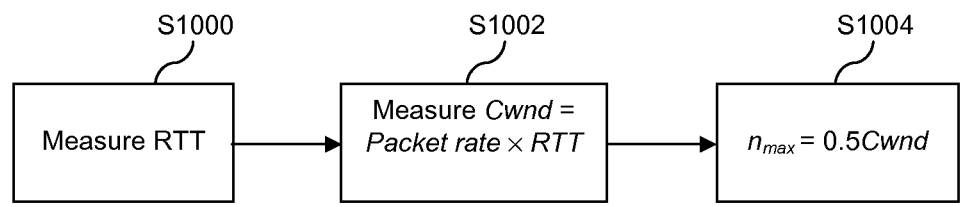
FIG. 10 is a flowchart schematically illustrating a method for calculating a minimum acknowledgement frequency according to an embodiment of the invention.

Then, at a step S1004, the maximum value for $n_{max}$ is determined as a predetermined multiple of Cwnd. In FIG. 10, the predetermined multiple is 0.5. The lower the multiple, the more frequently acknowledgements will be sent back to the sender 102. Hence, a minimum acknowledgement frequency f can be imposed. This may be desirable due to requirements imposed by users on the sender 102 and/or the receiver 104. For example, the sender 102 may require a certain number of acknowledgements per congestion window, and the predetermined multiple used at the step S1004 can then be set accordingly to ensure a minimum acknowledgement frequency.

It will be appreciated that other ways of setting the maximum value $n_{max}$ could be used for other purposes.

The value of $n_{max}$ could be used at the step S804 simply by limiting the value m to be at most $n_{max}$.

However, in one embodiment, $n_{max}$ is used in an additional, or alternative, way. At the step S804, once a potential value for m has been determined (as described above using a formula or lookup tables), then the acknowledgement configuration module 602 may determine the potential MCPS-saving that could result from using $n_{max}$ instead of using the current potential value for m. This could be achieved by reference to the plots shown in FIG. 4, or could be calculated, for example according to:

$$saving = \alpha r(1/m - 1/n_{max})$$

where r is the packet rate (as measured by the packet rate module 606) and a is a predetermined constant. If the MCPS-saving is then sufficiently large, then, at the step S804, the acknowledgement configuration module 602 may set m to be $n_{max}$ instead of the current potential value or m. The assessment of whether the MCPS-saving is sufficiently large could be, for example, whether the saving is greater than (Ta-T1) or (T2-Tb), or some other predetermined threshold.

It will be appreciated that, whilst the embodiments described involve a processing unit 200 with two modes of operation (normal mode and turbo mode), other processing units 200 may have more than two modes of operation, each with its own frequency of operation and power consumption levels. The above-described methods for setting the value of n (a) help prevent moving from a current mode of operation to another mode of operation that would consume more power and (b) help induce moving from a current mode of operation to another mode of operation that would consume less power. As such, the above-described method can also be applied to processing units 200 that have more than two modes of operation, so that the potential mode switches can be better managed to reduce power consumption.

Embodiments of the invention may be implemented as a computer program for running on a computer system. The computer program at least includes code portions for performing steps of one or more of the above-mentioned methods according to embodiments of the invention, when run on a computer system. The computer program may, for example, include one or more of: a subroutine, a function, a procedure, an object method, an object implementation, an executable application, an applet, a servlet, source code, object code, a shared library/dynamic load library and/or other sequence of instructions designed for execution on a computer system. The computer program may be provided on a data carrier, or data carrying medium. The data carrying medium may be a storage medium, such as an optical disk (e.g. DVD or a CD), a magnetic disk (such as a hard drive) or a memory (such as a flash memory, a ROM, a RAM, a memory card, etc.). The data carrying medium may be a transmission medium or a data connection, such as a telephone cable or a wireless connection.

The invention claimed is:

1. A method for processing data using a processing unit, wherein the processing unit has a first mode of operation and a second mode of operation for processing data, the second mode of operation requiring more power than the first mode of operation, the processing unit being arranged to switch between the first mode of operation and the second mode of operation based on a processing load for the processing unit, wherein the method comprises:
   receiving data packets from a sender;
   sending acknowledgements to the sender in respect of received data packets, wherein sending acknowledgements comprises sending one acknowledgement in respect of n received data packets;
   determining a metric indicative of a processing load for the processing unit; and
   setting the value of n to be a value m greater than a first predetermined value if the metric lies in a predetermined range that includes a value that the metric assumes when the processing unit switches between the first mode of operation and the second mode of operation, and to the first predetermined value otherwise.

2. The method of claim 1 further comprising:
   determining a packet rate corresponding to a rate at which said receiving data packets from the sender is performed; and
   determining the value of m based on the packet rate.

3. The method of claim 2 further comprising:
   determining whether a change in packet rate resulting from changing the value of n to a current value from an immediately preceding value exceeds a first predetermined threshold; and
   if the predetermined threshold is exceeded, resetting the value of n to the immediately preceding value.

4. The method of claim 1 further comprising:
   determining a maximum value for the value of n;
   determining a difference between the value that the metric would assume if the value of n were set to the value of m and the value that the metric would assume if the value of n were set to the maximum value of n; and
   setting m to be the maximum value for n if the difference exceeds a second predetermined threshold.

5. The method of claim 4 further comprising:
   determining the maximum value for the value of n based on:
   the time between the sender having sent a data packet and the time the sender receives an acknowledgement in respect of that data packet, and
   the packet rate.

6. A non-transient computer-readable storage medium storing instructions, executable by a processor, the instructions configured to:
   send acknowledgements to a sender of received data packets in respect of the received data packets, wherein sending acknowledgements comprises sending one acknowledgement in respect of n received data packets;
   determine a metric indicative of a processing load for the processing unit; and
   set the value of n to be a value m greater than a first predetermined value if the metric lies in a predetermined range that includes a value that the metric assumes when the processing unit switches between the first mode of operation and the second mode of operation, and to the first predetermined value otherwise.

7. The non-transient computer-readable storage medium of claim 6 storing further instructions configured to:
   determine a packet rate corresponding to a rate at which said receiving data packets from the sender is performed; and
   determine the value of m based on the packet rate.

8. The non-transient computer-readable storage medium of claim 7 storing further instructions configured to:

determine whether a change in packet rate resulting from changing the value of n to a current value from an immediately preceding value exceeds a first predetermined threshold; and if the predetermined threshold is exceeded, reset the value of n to the immediately preceding value.

9. The non-transient computer-readable storage medium of claim 6 storing further instructions configured to:

determine a maximum value for the value of n;

determine a difference between the value that the metric would assume if the value of n were set to the value of m and the value that the metric would assume if the value of n were set to the maximum value of n; and set m to be the maximum value for n if the difference exceeds a second predetermined threshold.

* * * * *